Feb. 2, 1960  H. J. SKIDMORE  2,923,339
LOCK NUT HAVING EXTERNAL PROJECTIONS DEFORMED RADIALLY INWARDLY
Filed Nov. 25, 1957

INVENTOR.
HAROLD J. SKIDMORE
BY
ATTORNEY

United States Patent Office 2,923,339
Patented Feb. 2, 1960

2,923,339

LOCK NUT HAVING EXTERNAL PROJECTIONS DEFORMED RADIALLY INWARDLY

Harold J. Skidmore, Southfield Township, Oakland County, Mich.

Application November 25, 1957, Serial No. 698,752

3 Claims. (Cl. 151—21)

This invention relates to lock nuts and more particularly to prevailing torque lock nuts having threads displaced by the projection of an excess of metal on the crown extension of the nut impacted into the threaded bore of the nut.

The invention generally comprises a nut having a crown extension on whose outer wall external projections have been integrally forged, welded or otherwise applied, which projections are squeezed, impacted or forced into the body crown preferably but not necessarily flush with the crown, thus forcing the threads in the areas adjacent to and in the path of the inwardly squeezed projections into the bore of the nut. The projections may be applied to the nut crown in any number, depending upon the amount of distortion of the threads required or desired for a particular application.

Although the lock nut here shown and particularly described is hexagonal in shape and the crown extension is cylindrical and tapered, it will be understood that a nut having any number of sides may be constructed in accordance with this invention.

It was found that prevailing torque lock nuts having indentations in their crown extensions or in the walls of the body are limited in their resiliency and torque. It appears that the displacement of metal by creating a depression or indentation weakens the body or crown so that the resilience of the nut at and adjacent to these indentations is measurably reduced. Another apparent defect is that distortion and displacement of threads by the formation of indentations in the nut body walls or crown is quite difficult to control, and uniformity in torque locking action is often lacking.

Instead of indenting the nut body wall or crown, the instant invention causes more metal to be applied initially to the crown, thereby strengthening the same and providing greater resilience for torque locking action. The additional metal is applied to the crown preferably by forging projections thereon as the nut is being formed. The projections may also be applied by welding them in place or by any other suitable means, wherein additional metal is applied exteriorly of the nut crown, prior to distortion and displacement of the nut threads.

By forcing the projecting metal into the wall of the crown of the nut, the internal threads are displaced in the area where the excess metal has moved the wall or crown metal inwardly thereof. The distortion and displacement of the threads may be controlled by the magnitude of the outer projections. When the projections are squeezed or forced into the nut crown, a portion of the metal immediately adjacent and in front of the projection, as it is forced inwardly, is moved into the threaded bore of the nut, the projections preferably terminating flush with the nut crown. The metal in the area of the squeezed in projection is denser than in the areas adjacent thereto, and the resilience and tensile strength of the nut crown is markedly increased.

As a correlative functional result of squeezing or forcing the projecting metal into the crown wall of the nut, it has been found that the threads in the areas of the projections and laterally and helically adjacent thereto acquire lubricant sealing properties. In certain automotive applications, nuts are required to seal in lubricants that are applied to studs, bolts or similar threaded elements, and sometimes under pressure. The lubricant sealing action of the nut becomes more than academic in such cases. Tests with nuts having dimpled or indented areas on their outer wall surfaces to provide inwardly displaced threads show that these nuts have increased torque locking action upon studs or bolts, but the claimed lubricant sealing characteristics appear lacking.

However, testing with lock nuts made in conformance with the instant invention clearly establishes that these nuts have lubricant sealing properties to a degree heretofore not possible. It is believed that the excellent physical and functional properties of the lock nuts here disclosed derive from the fact that by adding excess metal to the crown wall of the nut body, the resilience of the wall is increased rather than diminished, and therefore the locking torque upon the stud threads is effected by substantially the entire helix of the thread, rather than by spot or intermittent engagement of the nut and stud threads, in the areas of thread displacement.

It is therefore an object of the invention to provide a nut body with external projections on the crown wall thereof. Another object is to provide a nut with external projections that can be forced into the nut crown wall to displace the threads in the bore of the nut. A further object is to provide a nut in which the squeezed-in projections increase the density of the nut in these areas and increase the resiliency and tensile strength of the areas. It is yet another object to provide such projections on standard, commercially available lock nuts with a minimum of modification in tooling and methods of production.

These and additional objects of the invention and features of construction will become more apparent from the description given below, in which the terms are used for purposes of description and not of limitation.

Reference is now made to the drawing annexed hereto and forming an integral part of this specification and in which Fig. 1 is a side elevational view of a nut having a tapered cylindrical crown wall embodying the inventive features of construction.

In normal commercial practice, the preferred method for large volume production is to take coil steel, cut and forge into nut blanks with side walls, a crown if desired, and a bore, ready for tapping. In this method, the projections can be readily and easily formed on the exterior surface of the nut crown by the forging tools, relieved to provide the projections at the desired points on the nut. In addition to the preferred method, lock nuts also may be formed from bar stock of desired shape which is machined to finished dimensions on automatic screw machines.

Figure 1:
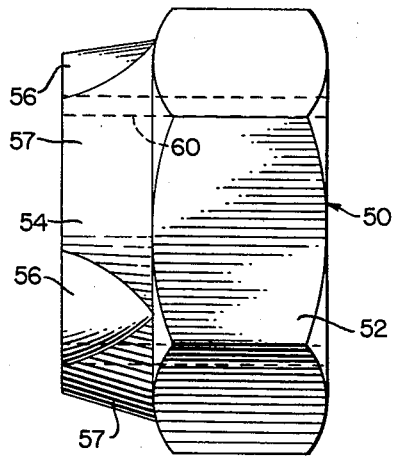
Figure 2:
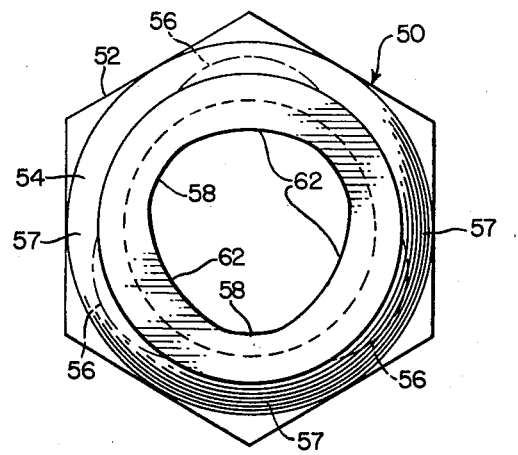
Fig. 2 is a top plan view of the nut shown in Fig. 1 after the exterior projections on the crown have been squeezed in flush with the crown wall, the projection area being shown in broken lines.
Figure 3:
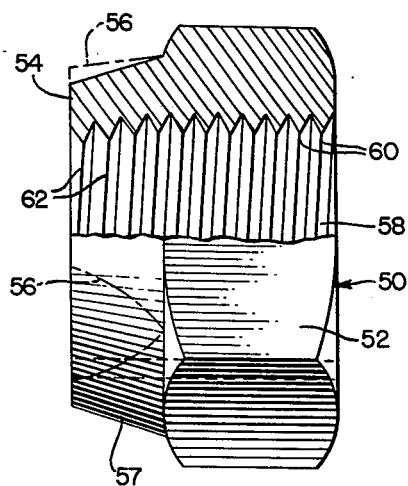
Fig. 3 is a side elevational view, partially in section, of the nut of Fig. 1 showing the displacement of the threads after the projections have been impacted or compressed into the crown wall.

The tapered cylindrical crown nut 50, shown in Figs. 1, 2 and 3, is provided with a hexagonal nut body 52 on one end of which is integrally formed a tapered cylindrical crown wall 54 having spaced projections 56 intermediate open areas 57 on the exterior surface thereof. The threaded bore 58 is provided with threads 60 that are displaced in the area of the projections to form deformed threads 62, when the projections 56 are impacted and squeezed into the crown wall 54 as above described for the other forms of the invention nut.

After tapping the nut blank, i.e. threading the bore of the blank, the projections 56 are impacted or squeezed into the nut crown wall 54, flush with the wall as shown. This operation causes the metal adjacent and in front of the projections 56 to move inwardly of the crown and to displace the threads 60 at 62 forwardly of the projections.

It will readily be understood by persons skilled in the art that all of the metal forward of the projections does not move inwardly. There is a certain amount of lateral displacement of the forces so that the resultant thread deformation at 62 is generally in the form of a smoothly blended curve of greater radius than is present in the remainder of the threads. This deformation resultant has the advantages not only of increasing the torque characteristics of the nut, but also of providing displaced thread portions which gall or mark the stud threads at a minimum in its binding action.

A tool having the diameter and complementary taper of the cylindrical crown 54 is used to squeeze the projections 56 into the crown wall, displacing the threads 60 into the bore in the areas 62 forward of the impacted projections.

It will, of course, be clearly understood by persons skilled in the art to which the invention pertains that standard forging dies designed for forging nut bodies of the shapes here disclosed, as well as other nut shapes which are used or may be used, may be modified to provide the projections on the nuts. And this is done by removing metal in the tooling to provide space for the projetcions to be formed on the nut side walls or crown walls.

It has been found that in the case of the tapered cylindrical crown nut 50, dies of the type used for forging the nut body without the projections can be used for squeezing in the projections 56 flush with the crown wall 54.

In some instances, it may not be necessary nor desirable to squeeze the projection 56 into the crown wall completely flush with the exterior surface thereof. In such event, only a portion of the projection can be squeezed into the wall, the resultant thread displacement being proportional to the advance of the projection into the wall. This proportion is not equal to the measure of advance of the projection because of the lateral forces which, of necessity, are generated in metallic bodies having the configurations here disclosed.

The forces which are applied to the projections to impact or squeeze them into the crown wall portion of the nut here described are preferably radially directed. However, the direction of the principal component of the impacting forces may be offset from a radial line to provide thread displacements having certain other characteristics than the uniform symmetrical arrangements here disclosed.

Although a single projection could be applied to the crown of a nut, the unbalance generated would not be particularly desirable in most nut applications. For reasons of control and balance in torque locking characteristics, it is preferred to provide a plurality of projections which balance the nut crown depending upon its configuration.

It should be understood also that any reasonable size, shape and number of projections may be used on the nuts, consideration being given to the amount of deformation desired. Spacing projections at equal distances apart from each other tends to balance the torque locking characteristics and provide better control thereover.

In operation, the nuts 50 are applied to studs or bolts by first screwing the nuts on from the ends which are undeformed. Up to the point where the stud threads meet the displaced thread portions, the nuts are free spinning. Thereafter, a wrench will advance the nut to a washer or seating position, firmly locking the nut upon the stud or bolt.

It will also be appreciated from the description given above that by increasing the resiliency of the nut body through impaction of the projections in the crown wall, the inward displacement of the thread portions tends to draw the thread areas, laterally and helically adjacent to the displaced portions and therebetween, closely upon the stud threads and there to form a lubricant sealing engagement with the stud threads.

Where nuts having threads displaced as a result of indentations or dimples on the crown wall or side walls and consequent improved torque locking action, fail to adequately seal the stud against lubricant leakage, tests made with the tapered cylindrical crown wall lock nut shown in the drawing clearly establish excellent and superior lubricant sealing properties.

Having described the invention in its simplest terms, it is to be understood that the features of construction may be changed and varied in greater or lesser degree without departing from the essence of the invention.

I claim:

1. In a prevailing torque lock nut, a nut body having a threaded bore and a tapered cylindrical crown at one end thereof, the wall of said crown having a plurality of externally formed projections squeezed radially into and flush with said wall to form areas of relatively greater density and resiliency, each of said projections having an upper edge terminating adjacent the end of said crown and side and bottom edges blending into and with said crown wall, the areas of lesser density intermediate said impacted projections providing an elastic component therefor, the threaded portions adjacent to and in the radial path of said inwardly forced projections being displaced inwardly of said bore.

2. The structure defined in claim 1, and in which the peripheral length of each of said areas of greater density in said crown wall taken at the top of said crown wall is substantially the same as the peripheral length of each of the areas intermediate said areas of greater density.

3. The structure defined in claim 1, and in which said projections are spaced equally apart from each other about the periphery of said crown wall.

References Cited in the file of this patent

UNITED STATES PATENTS

| 1,903,921 | Rupf | Apr. 18, 1933 |
| 2,388,467 | Cole | Nov. 6, 1945 |

FOREIGN PATENTS

| 12,174 | Great Britain | Sept. 8, 1888 |